Patented Apr. 22, 1941

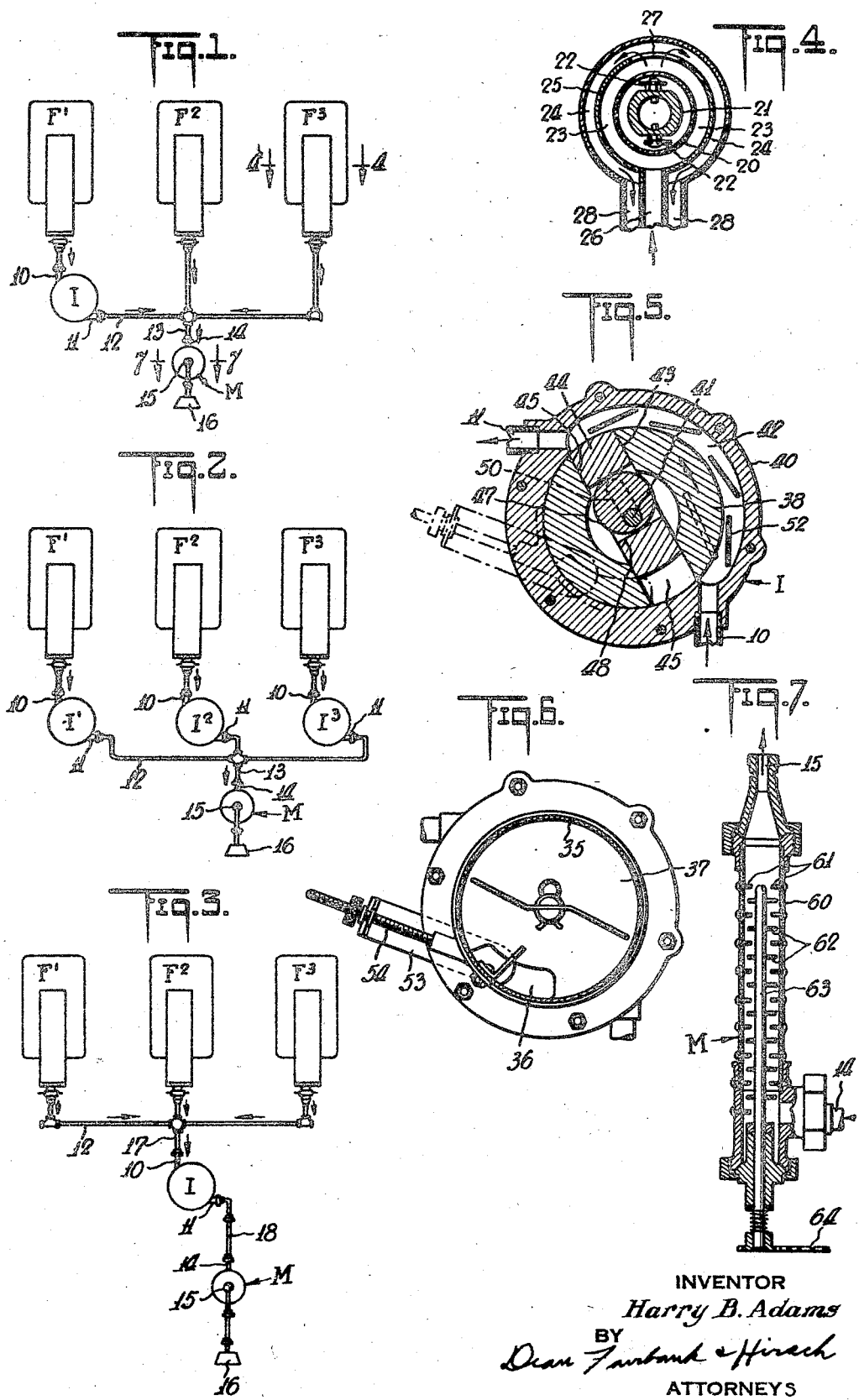

2,239,165

UNITED STATES PATENT OFFICE 2,239,165

SYSTEM FOR MAKING ICE CREAM

Harry B. Adams, Chicago, Ill., assignor to Cherry-Burrell Corporation, Wilmington, Del., a corporation Original application February 4, 1936, Serial No. 62,271. Divided and this application July 19, 1938, Serial No. 219,953

3 Claims. (Cl. 107—4)

The present application relates to a system for producing ice cream containing solid edibles, and is a division of my copending application Serial No. 62,271, filed February 4, 1936, which, on September 13, 1938, matured into United States Letters Patent No. 2,130,113.

In a system of this general type, utilizing a single continuous freezer of relatively large capacity for making semi-frozen plastic ice cream, and a device connected in the delivery conduit of said freezer for injecting edible solids into the ice cream delivered from this freezer, the difficulty arises, that any variation in the constituents or hardness of this ice cream or the distribution of the edible solids is carried to the ultimate product delivered from said system. Furthermore, since the efficiency of the freezer depends to a certain extent on the capacity at which it is run, the operation of the freezer at a low capacity causes a material reduction in its efficiency. Also, when it is desired to clean or repair the freezer, the entire system has to be shut down.

One object of the present invention is to provide a continuous system for producing ice cream containing solid edibles, in which the disadvantages above referred to are eliminated.

In carrying out certain aspects of the present invention, I provide a battery of continuous pressure freezers connected in parallel, an edible solid injector at the outlet of at least one of said freezers, and a device for mixing the solid edibles with the semi-frozen plastic ice cream delivered from all of said freezers. By means of this construction, any variation in the constituents or hardness of the mix from the different freezers will be averaged out in the mixing apparatus, so that a uniform combined product is obtained. Furthermore, such a system lends itself to easy flexible control within a wide range, without substantial impairment in the efficiency of the freezers. For instance, when it is desired to run the system at low capacity, one or more of the freezers can be shut down, while the other freezers can be operated at substantially full capacity, thereby assuring efficient operation of these latter freezers. Also, this system permits any one of the freezers to be shut down for cleaning or repair purposes without shutting down the whole system. Furthermore, the combined product is extruded from the system by the combined pressure built up by all of the freezers, the injector, and the mixing or blending unit.

The system of the present invention can be operated in different manners to produce different results. For instance, if it is desired to form multi-flavor ice cream bricks, or fill cartons with layers of different flavors, the ice cream mix from some or all of the freezers can be by-passed by means of suitable valves around the edible solid injector and the mixing unit, and the respective streams of different flavors extruded through a nozzle in overlapped unmixed relationship.

Various other objects, features and advantages of the invention will be apparent from the following particular description, and from an inspection of the accompanying drawing, in which:

Figs. 1, 2 and 3 are somewhat diagrammatic top plan views, showing various arrangements in accordance with the present invention, for utilizing a battery of freezers in conjunction with a single or a plurality of injecting devices and a single mixing apparatus.

Fig. 4 is a transverse section on a somewhat larger scale taken on line 4—4 of Fig. 1, and shows one type of continuous pressure freezer that can be utilized in conjunction with a system embodying the present invention.

Fig. 5 is a horizontal section on a somewhat larger scale, taken through one of the injecting devices, and shows one form of such device, which may be utilized in conjunction with a system embodying the present invention.

Fig. 6 is a horizontal section of a hopper, which may be used as a part of the injecting device, another portion of which is shown in Fig. 5, and Fig. 7 is a section taken on line 7—7 of Fig. 1, but on a somewhat larger scale, and shows a form of mixing unit that may be used in conjunction with a system embodying the present invention.

In Fig. 1 is shown an arrangement, in which an injecting apparatus is utilized to inject edible solids such as nuts and fruit into a stream of plastic ice cream delivered from a single continuous pressure freezer, and the resultant mixture is blended and intermixed with the output of one or more other freezers. In this arrangement, there is provided a battery of continuous pressure freezers connected in parallel, three of such freezers, $F^1$, $F^2$ and $F^3$ being shown. One of said freezers, as for instance the freezer $F^1$, is connected to the inlet 10 of the injecting apparatus I. The outlet 11 of this injecting apparatus I, and the outlets of the other two freezers $F^2$ and $F^3$ are connected in parallel to a pipe 12 from which leads the delivery pipe 13 to the inlet 14 of a mixing apparatus M. The outlet 15 of this mixing apparatus leads to a suitable delivery device 16, which may be used for filling cans, cartons, tubes, wrappers or the like, or for forming extruded bars, rods or bricks.

In Fig. 2 is shown an arrangement, in which each freezer is associated with a corresponding injecting apparatus, and in which the outputs of two or more such combinations are intermixed in a single mixing apparatus. In this arrangement, the outlets of the freezers F¹, F² and F³ are shown connected respectively to the inlet sides 10 of three injecting apparatus I¹, I² and I³ respectively, the outlets 11 of which are connected in parallel to the pipe 12. This pipe 12 has a take-off pipe 13 leading to the mixing apparatus M, and the outlet 15 of said apparatus leads towards the filling apparatus 16, as already disclosed with reference to the arrangement of Fig. 1.

In Fig. 3 is shown an arrangement in which the outputs of a battery of freezers are merged into a single stream, which is then directed through an injecting apparatus and a mixing apparatus. In this form, the outlets of the freezers F¹, F² and F³ are connected directly in parallel to the pipe 12, to which is connected a take-off 17 leading to the inlet side 10 of the injecting apparatus I, the outlet side 11 being connected to the mixing apparatus M through a pipe 18. The outlet 15 of this mixing apparatus is connected to the filling apparatus 16.

The specific type of freezer per se forms no part of the present invention, and may be of the continuous pressure type disclosed in the Patents Nos. 1,783,864, 1,847,149 and 1,962,386. A cross-section through such a freezer is shown in Fig. 4, as illustrated. It includes a tubular member 20, serving as a freezing chamber for the mix to be aerated and frozen, and having a rotatable agitator 21, carrying blades 22 for scraping engagement with the inner periphery of said chamber. The refrigerant is delivered through an inlet 26 to an annular refrigerant chamber 23 encircling the chamber 20. Around the chamber 23 is an outer chamber 24 separated from said chamber 23 by a wall 25 having a port 27 at the top. The outer passageway 24 has an outlet 28 which may encircle the inlet 26. The refrigerant, in returning through the outer chamber 24, prevents the refrigerant in the inner chamber from absorbing heat from the outside atmosphere. The outer chamber 24 is encircled by insulation, not shown. These details form no portion of my invention.

The injecting apparatus I per se forms no part of the present invention, and may be of the general type disclosed and claimed in my co-pending application above referred to. Merely as an example, this injecting apparatus may include a hopper or supply receptacle 35 for the solids, such as nuts or fruits or particles thereof, disposed directly above the injecting mechanism, and provided with a segmental discharge opening 36 in its bottom wall 37 through which the solids are permitted to gravitate to said injector mechanism below.

The injector mechanism comprises a rotor 38, having a close rotary fit in a stationary housing 40, closed at its upper end by the bottom hopper wall 37. This rotor 38 is driven by a shaft 41 extending coaxially with the hopper 35, and driven from a suitable motor (not shown).

The rotor housing 40 is provided with an elongated curved recess 42, following a portion of the periphery of the rotor 38, and closed at the top by the hopper wall 37. This recess 42, which serves as a passageway for the ice cream delivered from the freezers, and which extends around approximately one-half the periphery of the rotor 38, is provided with the inlet 10 at one end, and the outlet 11 at the other end, both tangential to the rotor. The semi-frozen plastic material such as ice cream, is directed under pressure from the freezer or freezers into the inlet 10, through the recess or passageway 42 and out through the outlet 11.

In order to transfer successive predetermined charges of solids from the hopper 35 to the passageway 42, the rotor 38 is provided at its upper surface with a diametrically extending channel 43, in which is slidably mounted a plunger 44, shorter than the diameter of the rotor, so as to form a pocket 45 first at one end and then at the other during reciprocation. For reciprocating this plunger 44, the wall member 37 is provided on its underside with a stationary cam 47, extending into a channel 48 provided in the central upper side of said plunger 44. This cam 47 is in the form of a circular disc, so positioned eccentrically of the rotor 38, that when a pocket 45 reaches the outlet end of the passageway 42, the plunger will have reached the end of its stroke, and the metered contents of said pocket will have been entirely ejected into said passageway. The shuttle movement of the plunger 44 is permitted by a longitudinal slot 50 into which extends the shaft 41.

In the operation of the injecting mechanism, as the rotor 38 is rotated in a counter-clockwise direction, as shown in Fig. 3, the pocket 45 which has just completed a discharging phase, approaches the discharge opening 36 of the hopper 35, while the other pocket 45 with a charge of solids therein, moves along the passageway 42. During this movement, the plunger 44 is receding from one pocket 45 and moving radially outwardly in the other pocket to progressively discharge its contents into the passageway 42 along the length of the latter. As the empty pocket 45 moves beneath the hopper discharge opening 36, a portion of the solids is dropped from the hopper 35 into said pocket.

The rotor 38 is desirably operated at a peripheral speed which is different from the speed of flow of the ice cream in the passageway 42, so that the solids are distributed lengthwise of the moving stream.

In order to effect a better distribution of the solids ejected in the plastic material in the passageway 42, the bottom 37 of the hopper has a series of dispersion fins 52 extending into said passageway.

In order to regulate the amount of edible solids introduced into the pockets as they move beneath the hopper discharge opening 36, there is provided a valve plate 53 adjustable endwise across the bottom of said opening by means of an adjusting screw 54.

The agitating or blending apparatus M shown in Fig. 7, does not per se form any part of the present invention, and as far as certain aspects of the invention are concerned, may be of any suitable type. In the specific form shown, this mixing apparatus M comprises a cylindrical casing or chamber 60 having a series of pins or fingers 61 projecting inwardly from the wall thereof, and co-operating with a series of pins or fingers extending transversely from a rotatable agitating shaft 63. This shaft may be rotated from the rotor shaft 41 of the injecting apparatus I through a sprocket and chain drive 64.

The ice cream with the solids incorporated therein flows into the chamber 60 through the inlet 14, and upwardly through the chamber outlet 15. During this upward flow, the ice cream and the solids are thoroughly intermixed, so that said solids are uniformly distributed throughout the mass of ice cream. The thoroughly mixed ice cream and the solids are then discharged from the outlet 15, and may be delivered into receiving cans, containers, cartons, wrappers or the like. A can filler 16 which may be used is disclosed in the Vogt and Wymond Patent No. 1,-881,106, issued August 4, 1932.

In all of the arrangements shown in Figs. 1, 2 and 3, the partially frozen ice cream from the various freezers, with the solid edibles incorporated therein, are thoroughly intermixed in the mixing or blending apparatus M, so that the combined product will average out any variations in the constituents or hardness of the ice cream coming from the individual freezers, or irregular delivery of solids by the injector.

Although no valves are shown in any of the arrangements of Figs. 1, 2 and 3, it must be understood that in actual practice such valves are present in the piping system, so that any one of the freezers may be cut out of the system for cleaning or repair purposes without the necessity of shutting down the entire system. Furthermore, it must be understood, that in any one of the three arrangements, suitable valves may be provided for by-passing the mixing apparatus, and if desired, the injecting apparatus, so that if the three freezers produce ice cream of different flavor, the respective streams of ice cream may be extruded through a nozzle to form multi-layer bars, rods or bricks.

In the construction shown in Fig. 1, the ice cream from one of the freezers only has the necessary solid edibles injected therein. The mixture is then blended or diluted with the ice cream from the other freezers to produce the required percentage of solids and nuts in the ultimate combined product. This construction, besides the advantages previously referred to, avoids the necessity of having an injector built of a size comparable to the capacity of the different sizes of freezers, and at the same time secures uniform distribution of the solid edibles in the final product.

In the construction shown in Fig. 2, the various injectors may be used for different solid edibles. For instance, injector $I^1$ may be used for one type of nuts, injector $I^2$ may be used for another type of nuts, and injector $I^3$ may be used for fruits. This construction, besides the advantages previously referred to, permits easy and effective control of the various ingredients of the solid edibles through the respective injectors.

The construction of Fig. 3, besides the advantages previously referred to, has the advantage of injecting the solid edibles into the combined stream of the various freezers, so that less agitation is necessary in the mixing apparatus M to effect uniform distribution of these edibles throughout the entire mass of ice cream.

Having thus described my invention, what I claim as new and desire to secure by Letters Patent is:

1. A continuous system for producing, blending and delivering ice cream containing solid edibles, including a plurality of continuous freezers connected in parallel for making semi-frozen plastic ice cream, a device at the outlet of only one of said freezers for injecting solid edibles into the stream of ice cream delivered from said latter freezer, a mixing apparatus, and piping for merging the material delivered from said injecting device and the ice cream delivered from the other freezers and delivering the merged product into said mixing chamber.

2. A system for producing ice cream containing edible solids therein, including a pair of continuous pressure freezers for making semi-frozen plastic ice cream, a device connected to the outlet of one of said freezers for injecting solid edibles into a stream of semi-frozen plastic ice cream delivered from said latter freezer, an apparatus for agitating and mixing the solid edibles and semi-frozen plastic ice cream to effect a uniform mixture of said materials, and piping for merging the material delivered under pressure from said injecting device and from the other freezers and delivering the merged product under pressure into said mixing apparatus.

3. A battery process for continuously producing fruit-laden ice cream to form a substantially uniformly hard, fruit-laden ice cream product which comprises the steps of continuously freezing ice cream to a semi-solid form in a plurality of continuous, super-atmospheric pressure ice cream freezers, injecting solid, edible fruit under super-atmospheric pressure into the semi-frozen ice cream produced by one of said freezers, combining the ice cream into which said fruit has been injected with the ice cream produced by the remainder of said freezers, and forcing the combined ice cream and fruit product from all of said freezers through a blender to produce an ice cream product having uniform hardness and uniformly distributed solid, edible fruit products therein, said ice cream being forced from said freezers to and through said blender by the super-atmospheric pressure developed in said freezers.

HARRY B. ADAMS.